United States Patent
Korman et al.

(12) 
(10) Patent No.: US 6,318,536 B1
(45) Date of Patent: Nov. 20, 2001

(54) MULTI-TRANSACTION COIN MACHINE

(75) Inventors: Bruce R. Korman, Los Angles, CA (US); August Golds, Grat Korn (AT)

(73) Assignee: Cash Technologies, Inc., Los Angeles, CA (US)

( * ) Notice: Subject to any disclaimer, the term of this patent is extended or adjusted under 35 U.S.C. 154(b) by 0 days.

(21) Appl. No.: 09/328,529

(22) Filed: Jun. 9, 1999

Related U.S. Application Data (63) Continuation of application No. PCT/US98/22534, filed on Oct. 23, 1998.
(60) Provisional application No. 60/062,751, filed on Oct. 23, 1997.

(51) Int. Cl.[7] .................................................. G07D 9/04
(52) U.S. Cl. ........................................... 194/217; 194/347
(58) Field of Search ..................................... 194/216, 217, 194/218, 347, 348, 349; 453/17, 57, 32

(56) References Cited

U.S. PATENT DOCUMENTS

| | | | |
|---|---|---|---|
| 5,350,906 | 9/1994 | Brody et al. | 235/379 |
| 5,365,046 | 11/1994 | Haymann | 235/380 |
| 5,457,305 | 10/1995 | Akel et al. | 235/379 |
| 5,531,640 | 7/1996 | Inoue | 453/17 |
| 5,555,497 * | 9/1996 | Helbling | 194/205 X |
| 5,564,546 | 10/1996 | Molbak et al. | 194/216 |
| 5,665,952 * | 9/1997 | Ziarno | 235/380 |
| 5,746,299 * | 5/1998 | Molbak et al. | 194/344 X |
| 5,799,767 | 9/1998 | Molbak | 194/217 |

FOREIGN PATENT DOCUMENTS

| | | |
|---|---|---|
| 2188467A | 9/1987 | (GB) . |
| 3-63795 * | 3/1991 | (JP) ..................................... 194/347 |

OTHER PUBLICATIONS

Japanese Patent Abstract, Publication No. JP03–063795, Publication Date Mar. 19, 1991.
International Search Report, Dated Jan. 26, 1999.

* cited by examiner

*Primary Examiner*—F. J. Bartuska
(74) *Attorney, Agent, or Firm*—O'Melveny & Myers LLP (57) ABSTRACT

A multi-transaction coin machine is provided which accepts a number of coins, counts the coins and displays the value to a user. The user is presented a variety of options in exchange for the coins, including a receipt redeemable for cash, or a variety of electronic financial transactions, including paying bills or purchasing tickets. The multi-transaction coin machine is an innovation in self-service convenience, efficiency and functionality, providing the services of a variety of machines, such as coin machines, ATMs, ticket services, and bill paying services all in a single user-operated machine.

5 Claims, 9 Drawing Sheets

FIG. 9

MULTI-TRANSACTION COIN MACHINE

CROSS REFERENCE TO RELATED APPLICATIONS

This application is a continuation of co-pending PCT application, application No. PCT/US98/22534, filed Oct. 23, 1998, priority of which is hereby claimed under 35 U.S.C. § 120. The PCT application, application No. PCT/US98/22534, and this application as well, claims priority under 35 U.S.C. §119(e) to provisional application, application No. 60/062,751, filed Oct. 23, 1997. All of these applications are expressly incorporated herein by reference as though fully set forth.

FIELD OF THE INVENTION

The present invention relates generally to coin machines, and more particularly, to coin counting machines with multi-transactional capability.

BACKGROUND OF THE INVENTION

Convenience transactional machines operable directly by end users exist in a variety of forms. There are, for example, ATMs (automatic or automated teller machines) which dispense money, thereby avoiding the lines common in banks, and also providing access to funds in a multitude of locations and after normal banking hours.

Coin counting machines are also commonplace. Many of these machines require an experienced operator and are not geared for use by the end user. Those machines operable by the end user generally provide the user with a voucher redeemable for cash or merchandise. The end user must then wait in line, and perhaps even travel to a different location, to redeem the voucher for cash or merchandise.

Telephone operated machines which sell movie or event tickets with credit card payments and remote ticket pick up are also known. There are a variety of machines which, by way of example, dispense stamps, tickets, coupons, money orders, bank transactions or the like. U.S. Pat. No. 5,021,967 by Smith discloses an exemplary money order dispensing machine. Although it offers convenience with a quick and efficient method for dispensing money orders, this machine is meant to be operated by a system operator, not the end user or customer, and therefore does not require the capability to receive money. The '967 device is intended for clerks, not end users; it is merely dispensing money orders, and not actually transacting the sale. (The sale is a separate transaction, where the clerk receives the money from a customer.)

Similarly, there are machines that dispense lottery tickets, but again, they are meant to be operated by a system operator, not a customer, and therefore do not require the capability to receive money.

Although the conventional transactional machines all provide a limited level of convenience, they do not provide an integrated array of services directly to the end user. In addition to being single function machines, those machines presently available generally require an attendant to receive money and operate the machine, and are not independently operable by the end user. Coin machines presently do not offer financial transactions in exchange for coins. Convenience machines currently available generally do not offer the convenience of multiple transactions, do not offer the convenience of multiple payment sources, and do not offer the convenience of self service by the user. Bill paying services generally available are through a subscription, or an automatic withdrawal from a bank account. Further, it is well recognized and appreciated that there is a shortage of personnel necessary to provide a full complement of retail service employees.

Therefore, what is needed is a self-contained user-operable coin machine with multi-transactional capability. Preferably, such a coin counting machine would not be limited to coin transactions, but rather would be capable of accepting currency, debit cards, credit cards, smart cards, and the like.

SUMMARY OF THE INVENTION

A preferred embodiment of the present invention is directed to an integrated financial transaction terminal that satisfies this need by allowing the user to perform a variety of transactions, from paying bills to making purchases, utilizing a variety of payment means, including coins, currency, credit cards, debit cards, smart cards, and the like.

There is, therefore, provided in accordance with a preferred embodiment of the present invention a coin machine that includes a coin hopper with a container for coins, and a feed for feeding the coins in the container to a coin discriminator sensor. A controller calculates the monetary value of the coins in response to the coin discriminator sensor. Preferably, a transport device is provided for transporting the coins from a user to the container at a controlled flow rate, the flow rate being a function of the quantity of coins in the container. An exemplary transport device is a conveyer belt. It is also desirable that the controller cause the container to dispense debris after all the coins have been extracted from the container by the feed. In a preferred embodiment, the feed includes a moveable backplate bias toward the container and a circular disc rotatably mounted to the moveable backplate. In this embodiment, the controller causes the container to dispense the debris by moving the moveable backplate away from the container.

Multi-transactional capability with a coin machine is achieved with a coin counter for receiving coins from a user, and a coin discriminator for discriminating denominations of the coins. A user interface is provided for selecting one of a number of transactions. A controller determines the monetary value of the coins as a function of the discriminated denominations and generates instructions for a remote terminal, the instructions comprising a command to apply the determined monetary value of the coins to the selected transaction. The coin machine may also be capable of receiving currency, credit cards, debit cards and smart cards. Preferably, the coin machine interfaces with a remote service provider either directly or through a host terminal.

The multi-transaction coin machine offers a significant improvement, offering the user a variety of payment options. The user may elect to receive a receipt for cash or credit towards purchases at the store, but may also, among other transactions: pay bills, buy lottery tickets, buy catalog merchandise, buy event tickets, buy movie tickets, buy airline tickets, or deposit the money in a bank account. Further, if the amount of the coins deposited is insufficient to effect the desired transaction, the user may cover the difference with currency, a credit card, a debit card or a smart card. Moreover, by providing automated electronic transactions, at any time of day, the number of transactions that must be carried out by employees can be drastically reduced.

An attractive feature of preferred embodiments of the present invention is the ability to provide the general public access to electronic financial transactions, rather than restricting electronic transactions only to those with credit cards. Using only coins and cash, a user could complete a variety of other transactions electronically. For example, purchase of airline tickets could now be accomplished without the use of a credit card.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

Coin counting machines provide a convenient means for exchanging loose coins for currency. Generally, these coin counting machines accept coins from a user, sort and count the coins, calculate the value of the coins, and provide the value of the coins to the user with, by way of example, a printed receipt. The printed receipt can then be exchanged for goods, services or currency.

In a preferred embodiment of the present invention, a coin counting machine is equipped to apply the calculated value of the coins to any number of possible transactions selected by the user. This multi-transaction coin machine accomplishes its goal with a novel combination of services, consolidated into a single terminal for maximum convenience and efficiency to the user.

Figure 1:
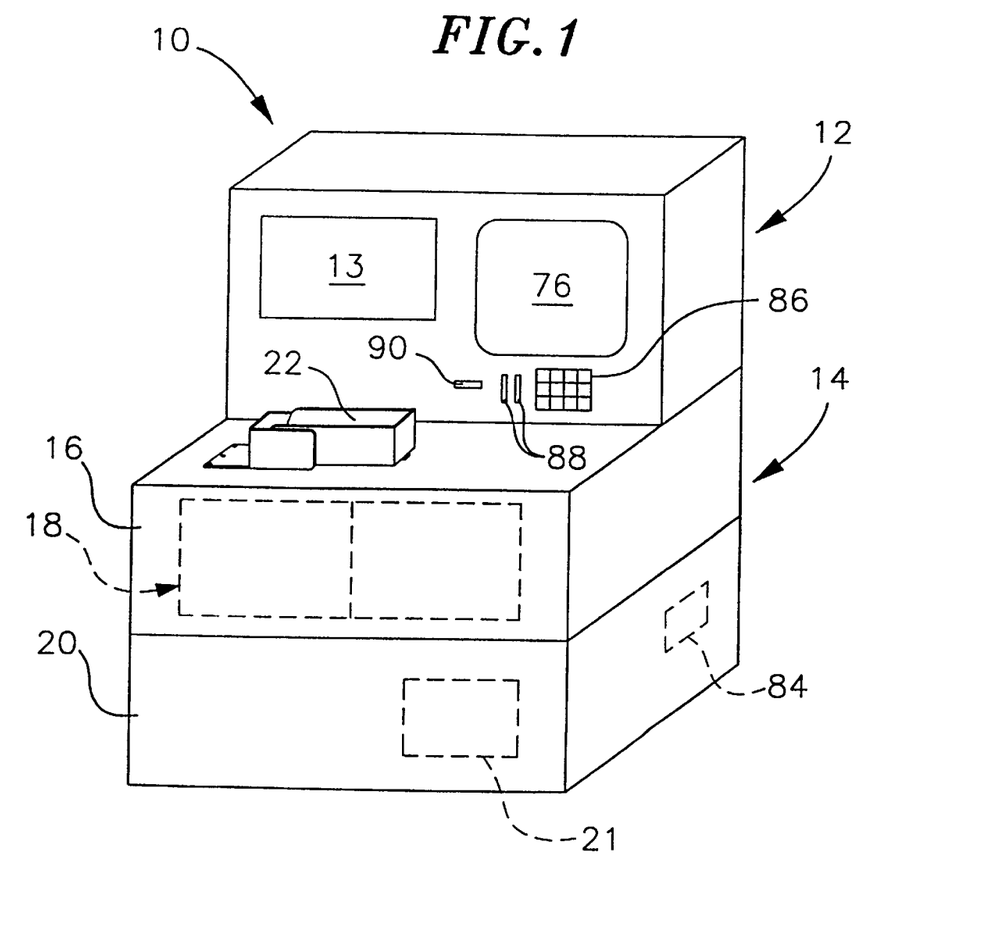
FIG. 1 is a perspective view of an exemplary coin counting kiosk.

Referring to FIG. 1, an exemplary coin counting kiosk 10 in accordance with a preferred embodiment of the present invention is shown. The coin counting kiosk 10 is a self-contained chassis having an upper cabinet 12 mounted on a rearward portion of the upper surface of a lower cabinet 14. The lower cabinet 14 is further divided into an upper portion 16 which houses a coin counting module 18, and a lower portion 20. It should be noted that the coin counting kiosk 10 chassis could take on many configurations depending on the particular environment in which the chassis is placed. With the upper cabinet 12 mounted on the rearward portion of the lower cabinet 14, a coin input tray 22 is conveniently mounted on the upper surface of the lower cabinet 14 in front of the upper cabinet.

In the preferred embodiment, the kiosk may be accessed exclusively from the front. Depending on the location and the installation, some embodiments may provide access exclusively in the rear of the device.

The upper cabinet 12 may provide a convenient method for commercial advertising with, by way of example, an illuminated light box 13, with advertising messages displayed on the exterior of said light box. In other embodiments, advertising or other messages may be displayed by a scrolling message sign, an animated sign, or by an LCD panel with video.

Figure 2:
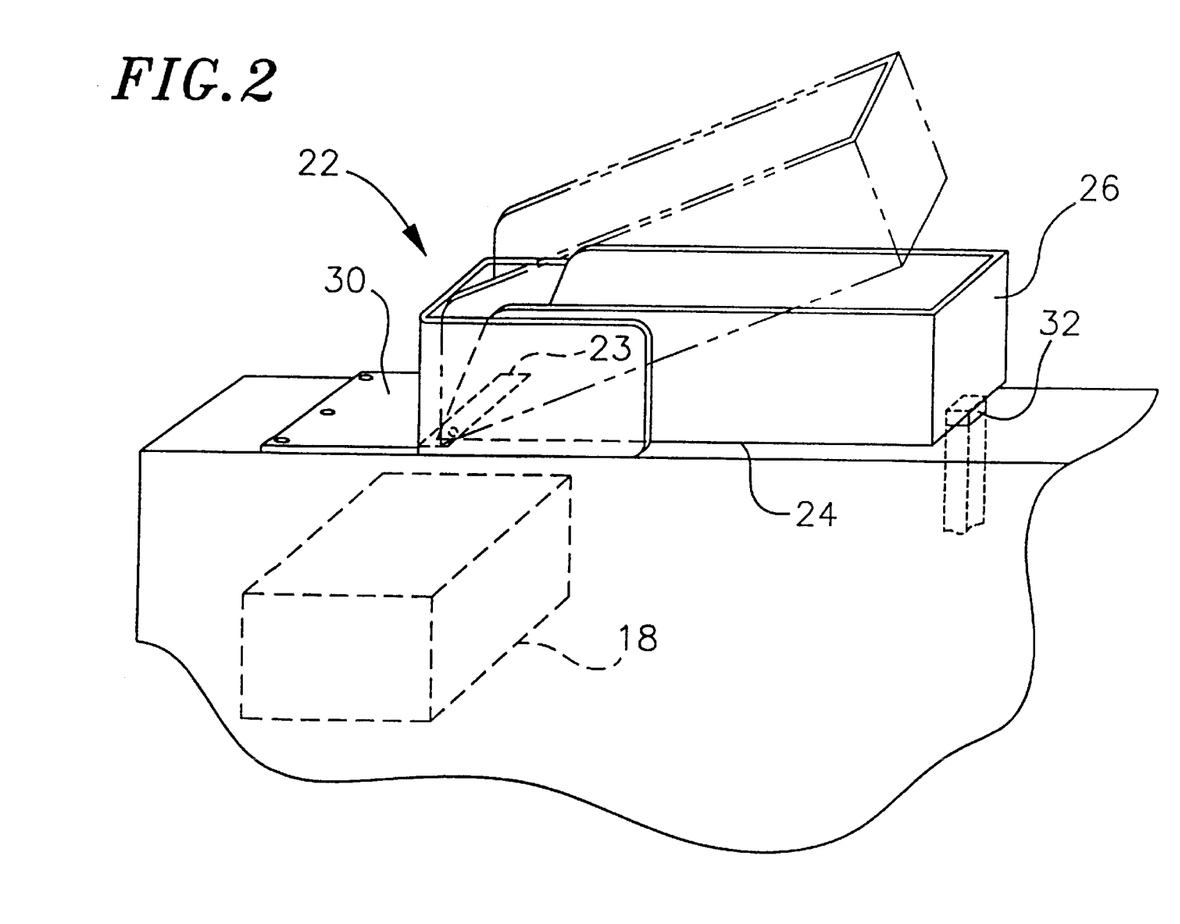
FIG. 2 is a perspective view of an exemplary coin input tray for the kiosk.

As shown in FIG. 2, the coin input tray 22 is constructed with a generally rectangular bottom surface 24 with a peripheral wall 26 enclosing three ends. The open end of the coin input tray 22 is positioned over an aperture 28 in the upper surface of the lower cabinet. The aperture 28 leads to the internally mounted coin counting module 18. A guard 30 is positioned around the aperture 28 so that when the bottom surface of the coin tray 22 is flush with the upper surface of the lower cabinet, the open end of the coin input tray 22 is forced up against the guard 30, preventing any coins from being introduced into the coin counting module 18. When the coin input tray 22, which is hinged with the guard 30 at the open end, is lifted from the opposite end, a small clearance 23 is formed between the bottom surface 24 of the coin input tray 22 and the guard 30. As a result, the coins in the coin input tray 22 are introduced into the coin counting module 18 through the small clearance 23. Preferably, the hinged coin input tray 22 is equipped with a lock down mechanism 32 that prevents unauthorized use. The lock down mechanism 32 can be implemented with a number of devices, by way of example, an arm 34 that extends from the internal portion of the machine and connects to the bottom of the coin input tray 22. Another embodiment utilizes a solenoid, which in its relaxed position protrudes into a side wall of the input tray, requiring power to the solenoid to release the coin input tray.

Another embodiment of the input tray provides an input tray with perforated surfaces, to allow liquid or debris to escape. In its resting position, the coin input tray would rest on a collector pan mounted directly below the coin input tray in the upper portion 16 of the lower cabinet 14, just beneath the upper surface of the lower cabinet. This collector pan would collect any debris or liquid escaping the coin input tray.

Figure 3:
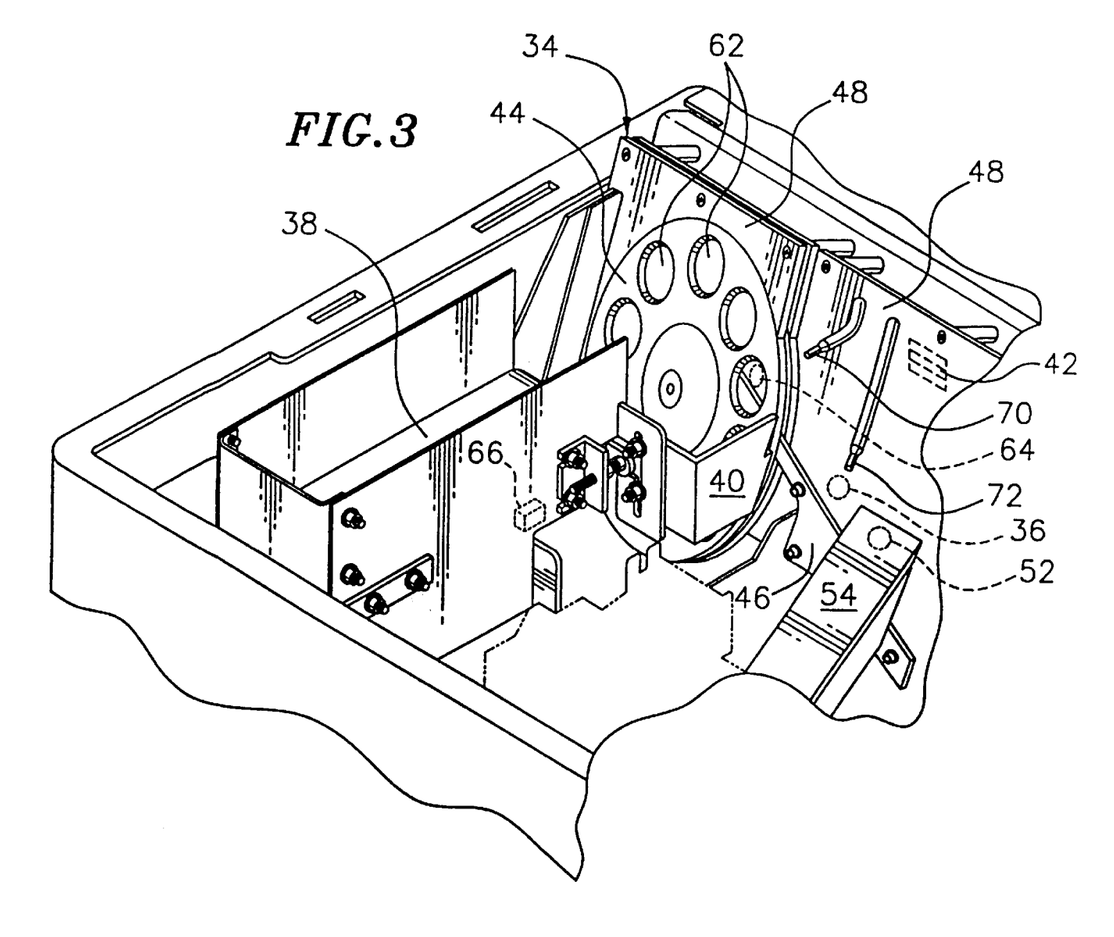
FIG. 3 is a perspective view of an exemplary coin counting module for the kiosk.

The mechanical features of a preferred embodiment of the coin counting module are shown in FIG. 3. A coin hopper 34 is used to collect the coins deposited into the machine and individually feed each coin, one at a time, to a coin discriminator sensor 36. To avoid overloading the coin hopper 34, a transport device is used to control the flow rate of coins into the coin hopper 34. A conveyer belt 38 extending from just below the aperture in the lower cabinet to the coin hopper 34 is one method for regulating the flow of coins into the coin hopper 34. It will be apparent that the same function can be achieved with a ramp, chute, lever or other means known in the art.

The coin hopper 34 includes a container 40 positioned at the end of the conveyer belt 38, and a moveable backplate 48 biased toward the container 40. In operation, the conveyer belt 38 causes the container 40 to fill with coins. A circular disc 44 rotatably mounted on the moveable backplate 42 extracts coins as it is rotated through the coin filled container 40 and feeds them onto a coin rail 46 one at a time. The coin rail 46 is mounted on the moveable backplate 48 at an incline. As each coin is moved down the inclined coin rail 46, it travels past the coin discriminator sensor 36 mounted behind the moveable backplate 48. The coin discriminator sensor 36 obtains a magnetic and/or electrical profile of each coin and forwards this profile to a controller 42 for further analysis. The controller 42 is preferably an embedded microprocessor based computer with a small footprint, such as a PC104 system. The controller 42 uses this profile to determine whether the coin is authentic, and if so, the value of the coin.

The range of profiles for acceptable coins is controlled through software, so that accepting other currencies requires only a simple software change. Other embodiments may utilize profiles to recognize tokens, or any coin shaped objects.

In the event that the controller 42 determines that the coin passing the discriminator sensor 36 lacks authenticity, a solenoid 52 mounted in the moveable backplate 48 downstream from the coin discriminator sensor 36 expels the non-authentic coin from the coin rail 46 into a rejection chute 54. The timing of the expulsion of the non-authentic coin is controlled by a sensor (not shown) within the solenoid 52 which detects the passing of the non-authentic coin. Those coins deemed authentic by the controller 42 continue along the coin rail 46 and fall into a storage container 21 located in the lower portion of the lower cabinet.

In one embodiment, an "escrow" feature allows the user to end the transaction and receive back the coins deposited. As the coins exit the coin rail 46, they are temporarily stored in an escrow container (not shown). The container is equipped with a level sensor. When the escrow container is full, or if not full, when the user has input all their coins, the user is provided the coin count and value, and queried whether to accept or reject the count. If the user accepts the count, the controller causes the escrow cup to empty the coins into the storage container. If the user rejects the count, the controller causes the escrow cup to empty the coins into a reject chute where they are returned to the user.

In another embodiment, the coins are sorted prior to being stored. Storage boxes are provided for each denomination of coin. A second coin rail may be used to effect the sorting, with appropriately positioned slots or knife arms to cause the correct denominations to fall into the respective storage containers.

As suggested above, the controller 42 manages the coin counting functions. A switch (not shown) for sensing the lifting of the coin input tray signals the controller 42 to begin the coin counting process. In response, the controller 42 applies power to a fixed speed conveyer belt motor (not shown) causing the coins input into the coin counting module from the coin input tray to be conveyed to the coin hopper 34. Concurrently, the controller 42 applies power to a fixed speed disc motor (not shown) which causes the circular disc 44 to rotate about its central axis. The circular disc 44 is preferably formed with a number of spaced apart holes 62 arranged around its periphery. Each hole 62 operates to extract a coin as it is rotated through the coin filled container 40. Another embodiment uses a disc with raised radial ridges or ledges extending outward from the center of the disc, with a depth adequate to extract coins. The extracted coin is then fed onto the coin rail 46 through a narrow slot 64 defined by the circular disc 44 and the moveable backplate 42 adjacent the coin rail 46.

A level sensor 66 mounted to the exterior of the coin hopper 34 is used by the controller 42 to monitor the level of the coins in the container 40. Once the level of coins in the container 40 exceeds a threshold level, the controller 42 removes power from the conveyer belt motor shutting down the flow of coins into the coin hopper 34. As a result, the level of coins in the coin hopper 34 can be reduced as coins are depleted from the container 40 by the rotating action of the circular disc 44. Once the level of coins in the coin hopper 34 drops below the threshold level, the controller 42 reapplies power to the conveyer belt motor reestablishing the flow of coins from the conveyer belt 38 into the coin hopper 34.

To prevent non-authentic coins, inclusive of objects other than coins, from blocking the narrow slot 64 and perhaps locking up the circular disc 44, a second solenoid 67 is located adjacent to the upper end of the coin rail 46, and when activated extends through a cylindrical cut-out portion of the moveable backplate 42 and into a peripheral hole 62, expelling the non-authentic coin. The second solenoid 67 is activated by the controller 42 when the circular disc 44 locks up. This condition can be detected in a number of ways. By way of example, level sensor 66 senses coins in the container 40 but the coin discriminator sensor fails to detect any coins traveling down the inclined coin rail 46, then the controller 42 determines that the circular disc 44 is locked up and activates the second solenoid 67 in an attempt to reinstate proper operation of the coin counting module.

After all the coins in the coin hopper 34 have been counted, the controller 42 removes power from the conveyer belt motor and disc motor, and calculates the total monetary value of the coins received by the coin counting module. Again, detecting the completion of the coin counting process can take a variety of forms. In the described embodiment, the controller 42 determines that the transaction is complete when the level sensor 66 indicates that the coin hopper 34 is empty and the coin discriminator sensor 36 no longer detects any coins traveling along the coin rail 46. Motion sensors (not shown) could also be used to detect whether the conveyer belt 38 and the circular disc 44 are still active. This approach results in a more reliable determination by the controller 42 that the transaction has in fact been complete. For example, if the controller 42 determines that the coin hopper 34 is empty and that no coins are being detected by the coin discriminator sensor 36, higher reliability could be obtained by verifying that the conveyer belt 38 is moving. If the conveyer belt is stalled, there still may be coins that need to be counted notwithstanding the fact that the coin hopper 34 is empty and the coin discriminator sensor 36 is no longer detecting coins.

After the completion of the transaction, it is desirable to perform a number of automated maintenance procedures on the coin counting module. By way of example, it has been found that higher reliability can be achieved by periodically removing accumulated debris from the coin hopper 34. To this end, after power is removed from the conveyer belt motor and disc motor, the controller applies power to a coin hopper motor 68 which causes the moveable backplate 42 to move away from the circular disc 44 thereby releasing any debris that may have accumulated in the container 40. Another useful maintenance procedure entails the removal of debris from the coin rail 46 especially around the coin discriminator sensor 36 and the narrow slot 64 defined by the circular disc 44 and the moveable backplate 42. This is accomplished, in a preferred embodiment of the present invention, with two small air hoses 70, 72 mounted on the moveable backplate 48 above the coin rail 46 and directed at the coin discriminator sensor 36 and the circular disc 44. While the moveable backplate 42 is still moved away from the circular disc 44, a compressor (not shown) is activated by the controller 42. As a result, the two small hoses 70, 72 connected to the compressor, direct an air stream at the coin discriminator sensor 36 and the circular disc to remove any debris that has accumulated on the coin rail 46. Another embodiment utilizes a single hose mounted on the moveable backplate 48 just above the upper end of the coin rail 46. The hose is aimed downward at the upper end of the coin rail, which results in an air flow along the length of the coin rail.

Figure 4:
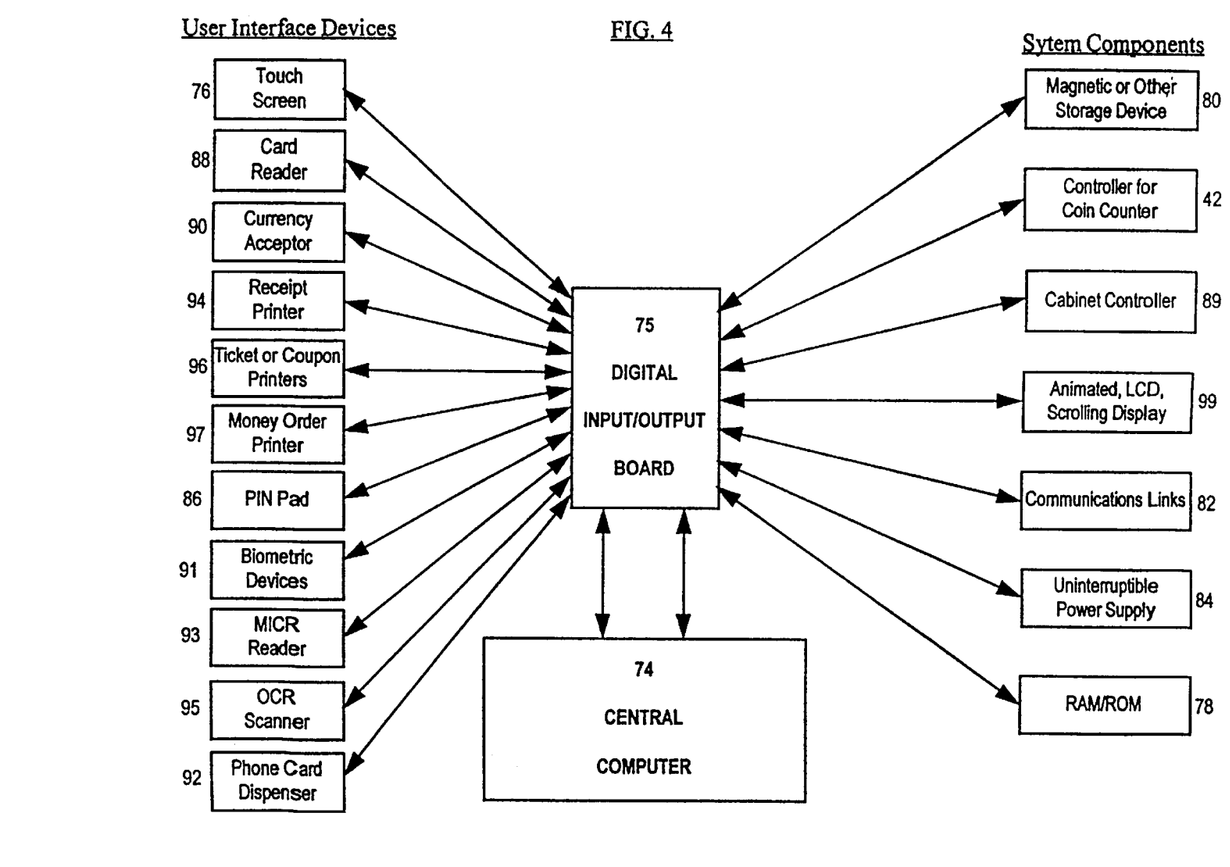
FIG. 4 is a block diagram of a central computer and associated circuitry for controlling the kiosk.

The operation of the coin counting module is controlled by a central computer housed in the upper cabinet of the coin counting kiosk. An electrical block diagram of the central computer and associated circuitry is shown in FIG. 4. In a preferred embodiment of the present invention, the central computer 74 is an Intel based PC system, coupled to a number of peripheral devices including a touch screen display 76, random access and read only memory storage 78, magnetic or other storage device 80, communications links 82, an uninterruptible power supply 84, input/output ports, and a user interface. The user interface can be any number of devices including a PIN pad 86, a card reader 88, a currency acceptor 90, a dispenser for pre-paid phone cards 92, a receipt printer 94, one or more ticket or coupon printers 96, MICR magnetic ink reader 93, an optical character recognition (OCR) scanner 95 to input printed data, a money order printer 97, or any other device known in the art. Virtual input devices may also be used, such as an on-screen virtual keyboard or keypad. Other user interface devices may include user identification devices such as a retinal scanner, video camera, thermal imager, biometric device 91 or other identification device. Preferably, several printers are used, including an event ticket printer and a receipt printer, and appropriate slots (not shown) are formed in the upper cabinet so that print outs from such printers may be received by the user.

In the described embodiment, the central computer 74 uses a digital input/output board 75 to communicate with and control the peripheral devices. This board may utilize Visual Basic, C, C++ or assembly language software to send and receive the data necessary to control the peripheral devices. The peripherals are attached and controlled via a bus. In the preferred embodiment, a Universal Serial Bus is used. Other embodiments may use a Controller Area Network (CAN) Bus, a Small Computer Systems Interface (SCSI) Bus, an Industry Standard Architecture (ISA) bus, an Extended Industry Standard Architecture (EISA) bus, a Peripheral Component Interconnect (PCI) bus, a Micro Channel bus, a Personal Computer Memory Card International Association CardBus (PCMCIA), a VersaModule Eurocard (VME) bus, or an IEEE 1394 bus or any ANSI or IEEE bus standard. An embodiment may also utilize the Intelligent I/O (I2O) architecture developed by the I2O Special Interest Group. The communications links 82 may include Plain Old Telephone Service (POTS), also known as Public Switched Telephone Network (PSTN), Integrated Services Digital Network (ISDN), or DSL modems, and can use TCP/IP for Internet connections. Another embodiment may use an RS-232 serial connection. An embodiment might include a direct network connection, such as an Ethernet connection using either shielded or unshielded twisted pair, coaxial or fiber optic cables. Other communication links might include an optical connection, a wireless RF modem connection, a cellular modem connection, or a satellite connection.

The touch screen display 76 of the coin kiosk is the primary means of communication between the user and the multi-transactional coin counting machine. Initially, the touch screen display 76 displays a message to the user and a start button. The coin kiosk is initially activated by touching the start button on the touch screen panel display 76. A self-diagnostic procedure is performed by the central computer 74 to ensure that all systems are operable, and the coin counting module is enabled. If operable, a message is displayed to the user to begin depositing coins into the input tray. Simultaneously, the central computer 74 releases the lock down mechanism 32 on the coin input tray 22. Once the user deposits the coins into the coin input tray, the user is instructed by the touch screen display 76 to lift the coin input tray 22 to begin the coin counting operation. As an optional feature, graphics could be displayed on the touch screen display 76 once the coins have been input into the coin counting module.

Returning to FIG. 1, the lower portion 20 of the lower cabinet 14 is used to store the coins after they have been counted by the coin counting module 18. The method of storage can have a significant impact the commercial efficiency of the retrieval process by authorized personnel and the effectiveness against fraud and theft. In a preferred embodiment, the coins are stored in a "smart box" 21 which stores information in a non-volatile memory device about when the smart box was installed, when it has been opened, and how many and what type of coins it contains. One embodiment of a smart box utilizes a memory button, which is a stainless steel encased flash chip, to store the data. This information can then be extracted from the "smart box" by the central computer in the upper cabinet and recorded in one of the peripheral storage devices described above. Alternatively, a non-memory secure storage container, such as a steel coin box, could be used. In another preferred embodiment of the present invention, a carousel supporting a number of canvas bags can be used. The canvas bags preferably meet banking industry standards for ease of removal and transportation. The carousel is arranged with one canvas bag positioned below the coin counting module 18 such that coins, deemed authentic by the controller 42, that continue along the coin rail past the rejection chute fall into that canvas bag. When the canvas bag is full, as determined by the central computer in the upper cabinet by the value of coins computed by the controller in the coin counting module, a carousel motor (not shown) is activated causing the carousel to rotate such that a new canvas bag is located below the coin counting module 18.

It is also desirable to house additional hardware components, such as telephone and other communication wiring, and the power connections for the coin kiosk in the lower portion 20 of the lower cabinet 14. An uninterruptible power supply 84 is also preferably located in the lower portion.

As a security measure, the lower portion 20 of the lower cabinet 14 can be electro-mechanically locked, and controlled by the central computer. In a preferred embodiment of the present invention, access to the lower cabinet requires one to "swipe" a security card in the card reader provided, and/or enter an access code on a keypad or on a virtual keypad displayed on the touch screen. This card and code system will prevent unauthorized access to the stored coins. The upper portion of the lower cabinet may also be electro-mechanically locked. In the preferred embodiment, access to the lower and upper portions of the lower cabinet, and the upper cabinet is authorized by different codes, and access to the respective cabinets must be separately obtained through the central computer. Thus, a security card and/or code for a technician may give him or her access only to the coin counting module 18 in the upper portion 16 of the lower cabinet or the electronics in the upper cabinet, whereas a security card and/or code for an armored security personnel may give him or her access to only the lower portion 20 of the lower cabinet 14.

The central computer 74 is also linked to the controller 42 for the coin counting mechanism, and is also linked to a cabinet controller 89 which controls access to the upper and lower cabinet, and also operates the locking devices and the locking mechanism 32 on the input tray 22.

After all coins have been processed, the controller 42 processes the received data, calculates an exchange value for the coins, and displays this information on the touch screen 76 for the user to read.

The user is then offered a variety of exchange options for the coins, including ending the transaction and returning the coins to the user, using the escrow feature discussed previously. In the preferred embodiment, the options are displayed on a video screen, prompting the user for responses, and allowing the user to respond through a system of hierarchial and contextual menus, or when no menu selection is appropriate, allowing the user to enter a response.

The user may request a receipt redeemable for cash or merchandise. Alternatively, the user may conduct electronic transactions, such as applying the exchange value of the coins towards a purchase, such as movie tickets, lottery tickets, event tickets, or airline tickets or applying the exchange value toward payment of a bill, such as power, gas, water, phone, cable or credit cards. Other embodiments may offer other transactions and purchases, such as catalog items, pre-paid phone cards, money orders or other electronic transactions.

In the preferred embodiment, the electronic transactions are effected by contact with a remote terminal. The computer in the kiosk, referred to for convenience as the kiosk PC, is networked to a host computer, remote from the kiosk. The network connection is preferably a dedicated direct connection, but may also be a standard modem connection, a wireless RF modem connection, a cellular modem connection, or any other network connection, such as an Ethernet connection. An Internet connection may also be utilized, using TCP/IP or other Internet protocol, through a dial-up connection, or an ISDN connection, or a dedicated Internet connection such as a cable modem or other digital or optical connection, or any other Internet connection available.

The PC in the kiosk and the remote host computer may use a distributed client/server architecture, to enable "on the fly" changes through changes made to the host computer software. All software and firmware in the kiosk may be updated or changed either remotely from the host or locally with an electronic device linked directly to the kiosk PC. For example, initial settings and configurations may be set at a kiosk by the kiosk connecting to the host. Any subsequent changes in the configuration for each connected kiosk could be made at the host, with a scheduled date for such changes to take place. Each time a kiosk contacts the host, it looks for changes to configuration files. The kiosk would automatically poll the host for changes, update its own software, and the change would take effect on the scheduled date. By way of example, one or many kiosks could be programmed to begin accepting certain tokens on a certain date, all from modifications made in the host software. Of course, these changes could also be made locally at each kiosk PC by means of a connection between an electronic device, such as a laptop or hand held computer, and the kiosk PC. In the preferred embodiment, the distributed client/server architecture is JAVA-based. An embodiment may utilize other languages such as C++. An embodiment may utilize standard technologies such as Internet Inter-ORB Protocol (IIOP), HTML, and Object Management Group (OMG) protocols.

Figure 5:
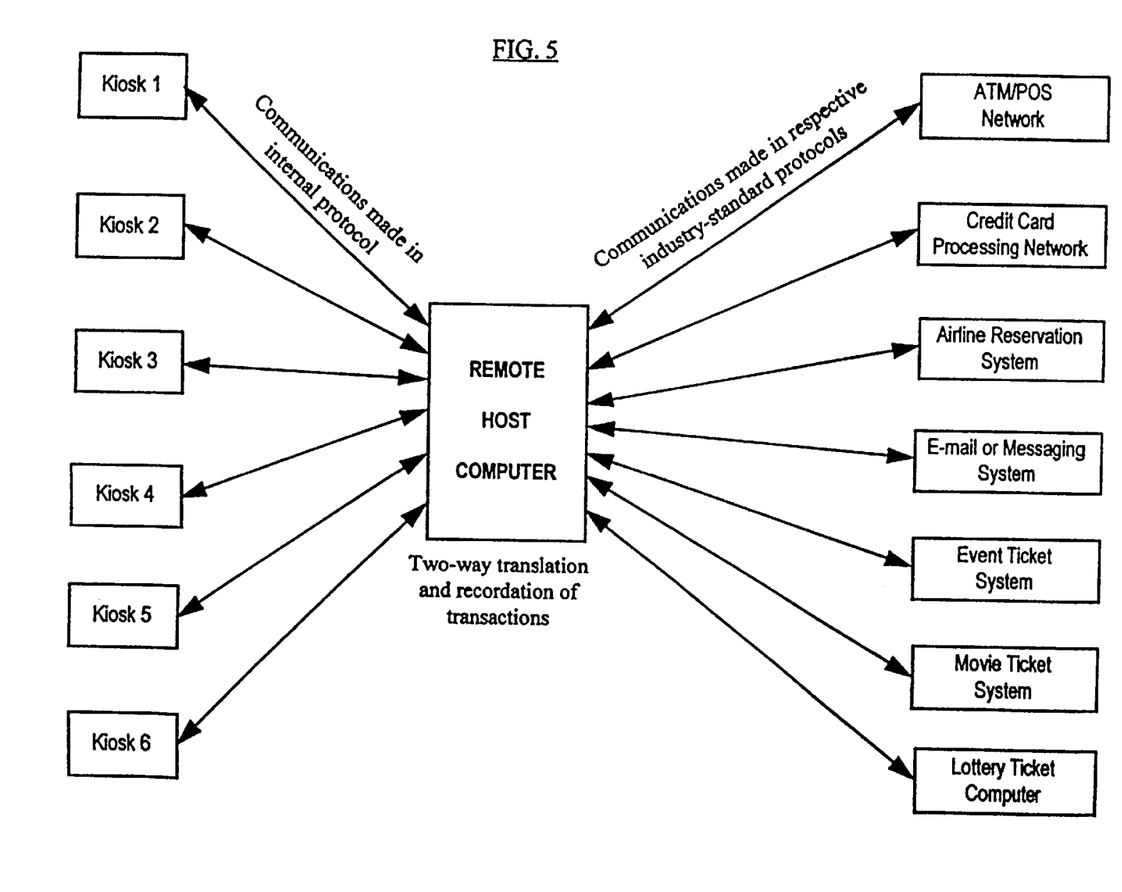
FIG. 5 is a block diagram of a host terminal for managing transactions of a plurality of kiosks with a plurality of service providers.

FIG. 5 shows a functional block diagram of a host terminal managing the transactions of a number of kiosk coin machines with a number of service providers in accordance with a preferred embodiment of the present invention. As shown, each kiosk has two-way communication with the remote host computer. The host computer in turn has two way communication with a plurality of remote terminals. For illustrative purposes, these remote terminals have been labeled in FIG. 5 with names representative of likely remote terminals that would be contacted by the host computer. For example, the remote terminal ATM/POS represents a known banking network which currently supports automatic teller machine and point of sale transactions. This network would be contacted to verify and obtain funds and to make deposits. Other existing networks are utilized to verify and process credit card transactions.

In a typical transaction, the kiosk PC would prompt the user for information on the desired transaction. The kiosk PC would then transmit this information to the host computer. The host computer would format the transaction in the appropriate industry-standard protocol, then contact the remote terminal. The data received back from the remote terminal would be processed by the host computer, formatted for a kiosk PC, and relayed back to the appropriate kiosk PC. This series of communication steps between a kiosk, the host and one or more remote terminals may be carried out several times for each transaction. For example, in purchasing an event ticket, the kiosk would first have to send reservation data. If the user were paying partially with coins and partially with an additional payment, the additional payment information would be sent to the host to be verified and obtained. Finally, the financial transaction would have to be completed to pay for the tickets.

In addition to processing transactions, the host computer may be used to monitor the individual kiosks. On a scheduled interval, the kiosks may transmit data regarding amount of coins stored, amount of currency received, level of paper or ticket stock, or other diagnostic and maintenance information to the host computer. The host may also initiate contact with the individual kiosk PCs, polling for data such as when components need service based on their use. The host may then evaluate the priority of service requirements for each kiosk, and schedule technicians accordingly. If the host finds that service is required, it may initiate a service call through an e-mail message to a paging service, which in turn pages a technician. Until the e-mail is acknowledged, the host will continue to send the service requests. The technician who responds to the page and services the unit enters a response in a two-way pager to signify who performed the service and what work was done. A technician can also initiate a diagnostic check through a two-way pager message, which is relayed by e-mail to the host, with the host instructing the kiosk PC to begin a diagnostic program.

In another embodiment, each kiosk PC could be networked to a single host, or each kiosk could be completely independent, originating its own communications to third parties to effect transactions. Reference to contacting a remote terminal include both the kiosk PC contacting a host, and the host contacting a remote terminal, or the kiosk PC contacting a remote terminal directly.

In the preferred networked environment, each kiosk PC would send transaction instructions to the host computer. The host computer would translate these instructions to the appropriate protocol, contact the third party, receive the information, translate into a new format if necessary, then transmit the information to the appropriate kiosk PC. In a non-networked environment, the individual kiosk PC would communicate directly with third parties, and perform all necessary protocol translations itself.

In another embodiment, instructions to third parties could be batch-processed rather than communicated in real time. The functioning of the kiosk would be the same, except that communications to the host or third party would be made at scheduled intervals, communicating all transactions in a single batch. An alternative to this would be a delayed batch process, where the communications are stored by each kiosk PC, either internally or on removable storage media. A technician would periodically download or remove the data from each kiosk PC for processing.

Figure 6:
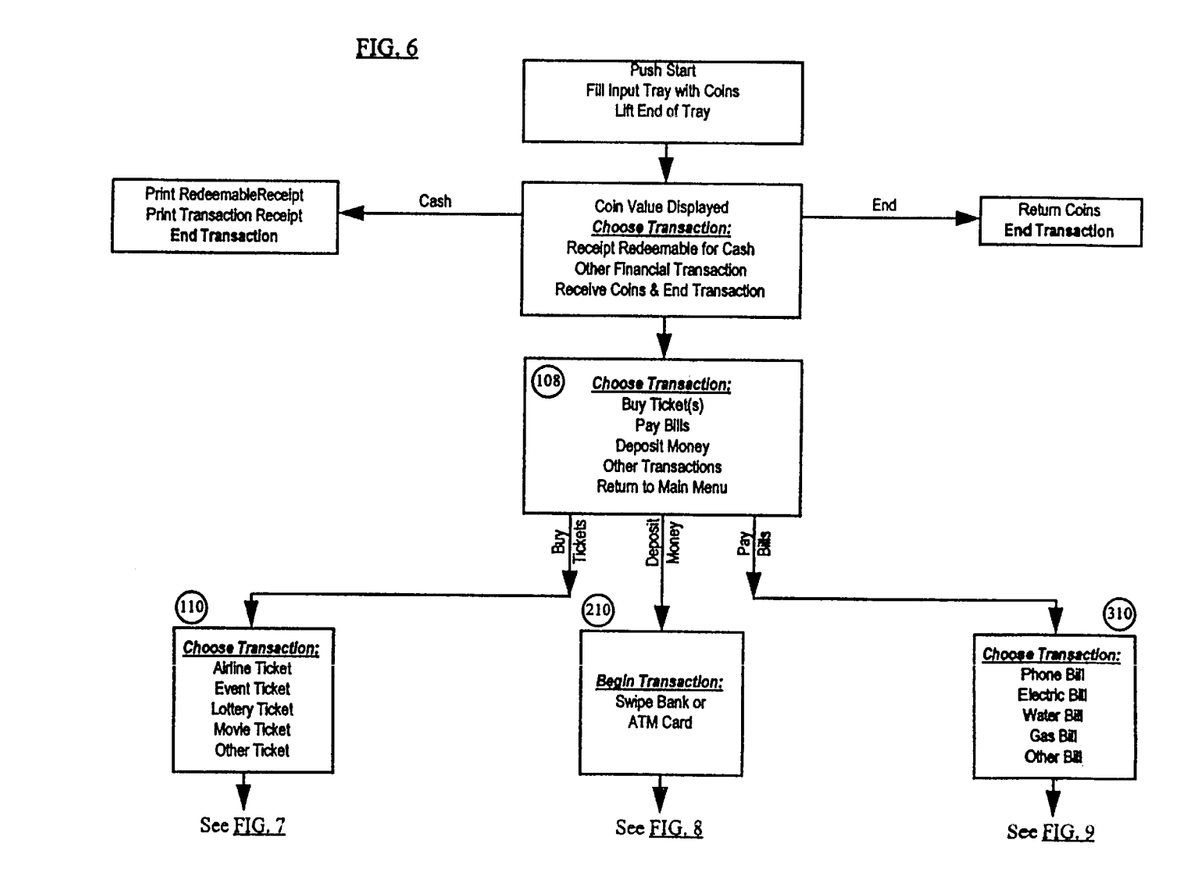
FIG. 6 is a flow chart illustrating an exemplary transaction performed by a kiosk.

FIG. 6 shows the steps involved in a typical transaction. Not all possible transactions have been shown; instead, those transactions representative of most transactions have been illustrated. Many other financial transactions could be performed, and would take forms similar to those illustrated.

The initial step 100 for a user at the kiosk is to push start on the touch screen. The user is instructed to put the coins in the input tray and lift the end of the tray to feed the coins into the machine. The machine would then process the coins, and display the value of the coins 110 on the video monitor. The user would then be given three main options: 1) receive a receipt redeemable for cash for the value of the coins; 2) perform an electronic transaction; or 3) have the coins returned and end the transaction. The second step 102 is for the user to choose a transaction. If the user selects a receipt redeemable for cash 104, the receipt is printed immediately, ending the transaction. Similarly, if the user chooses to end the transaction 106, the coins are returned and the transaction is over. When the user chooses to receive a receipt redeemable for the value of the coins, or when the user chooses to end the transaction and remove the coins, the transaction is processed locally and the kiosk does not contact the host computer. If the user chooses a purchase or transaction, the transaction menu 108 is displayed, offering a choice of possible types of transactions. Depending on the user's response to this menu, specific contextual menus will display. Choosing a ticket transaction 110, will bring up a menu offering a variety of ticket purchases. Choosing to deposit money 210 will similarly bring up a menu offering a variety of financial institutions. Choosing to pay bills 310 will bring up a menu offering a variety of bill types that may be paid. All three menus also offer an "other" selection in case the item desired by the user is not shown.

Figure 7:
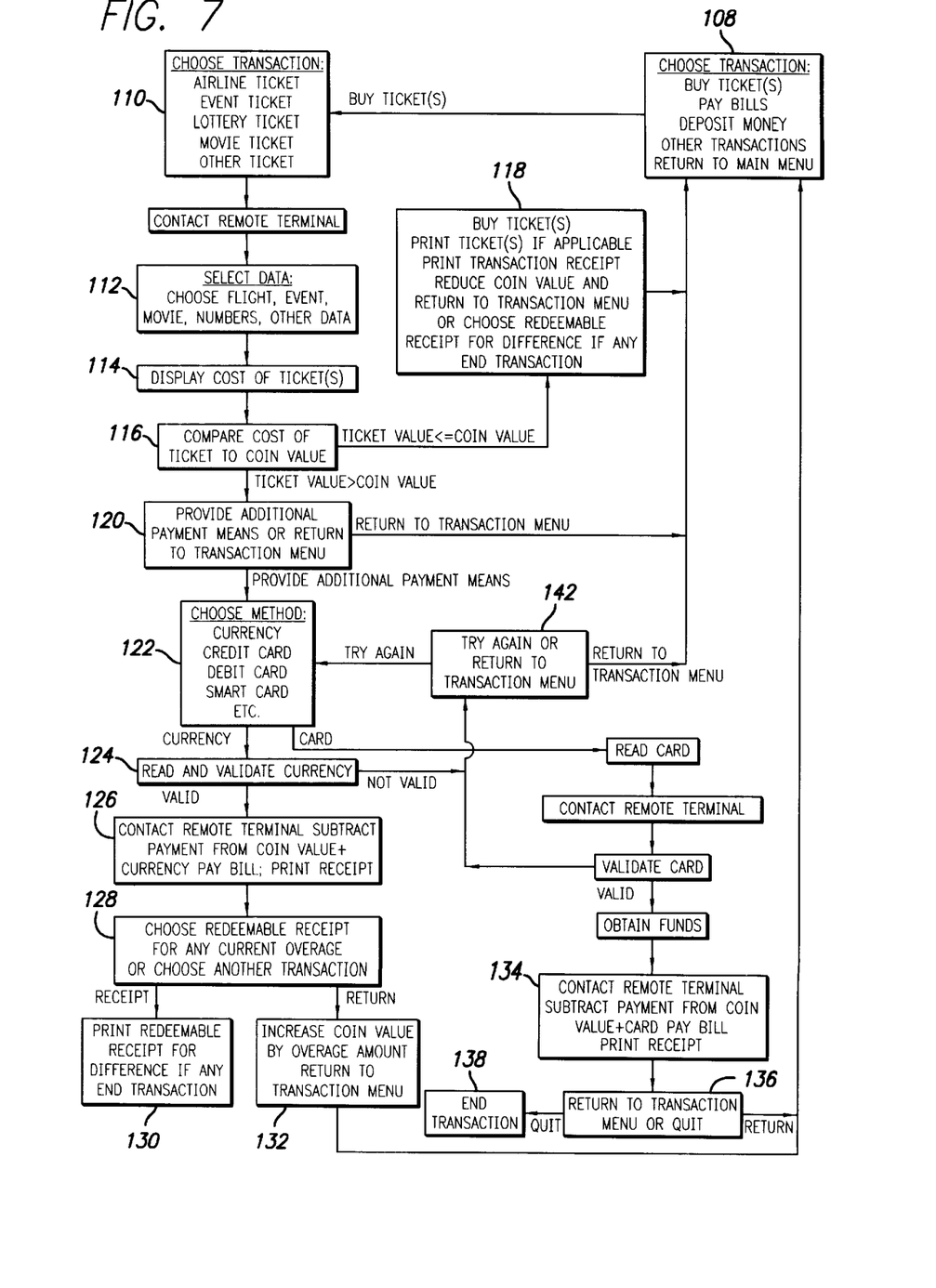
FIG. 7 is a flow chart illustrating an exemplary ticket purchase transaction performed by a kiosk.

Typical ticket transactions 110 are further detailed in FIG. 7. Based on the user's choice from the ticket menu 110, the computer will contact the appropriate remote terminal. The user would be provided a menu of available choices, and provide additional data 112 necessary to purchase the ticket, such as a particular flight, a particular event, specific lottery numbers to choose, a particular movie to watch, or other information. The information is relayed to the remote terminal and a ticket price is displayed 114. This price is compared 116 to the value of the coins previously displayed. If the value of the ticket is less than or equal to the value of the coins, the ticket is purchased and the user is offered a choice 118: receive a receipt redeemable for the difference between the ticket price and the coin value, and end the transaction, or return to the transaction menu 108. If the ticket price is greater than the value of the coins, the additional payment menu 120 is displayed. The user may choose to return to the transaction menu 108, or provide additional payments means. If additional payment is selected, a method of additional payment menu 122 is displayed.

The user may provide currency, which is read and validated 124. If valid, the remote terminal is contacted, the ticket is purchased, payment is subtracted from the combined value of the coins and the currency and a receipt issued 126. The user is then prompted 128 to choose either a redeemable receipt for any overage, or to return to the transaction menu for additional transactions. An overage occurs when the value of the coins added to the valid currency provided exceeds the ticket cost. If the user chooses a redeemable receipt 130, a receipt is printed and the transaction ends. If the user chooses to return to the transaction menu 108, the coin value is increased by the amount of the overage and the transaction menu is displayed.

The method of additional payment menu 122 also offers the use of credit card, debit card, or smart card. The user reads the card in the reader provided, and a remote terminal is contacted to verify the card. If verified, the funds are obtained. The remote terminal is contacted, the ticket is purchased, payment is subtracted from the combined value of the coins and the card, and a receipt issued 134. The user is then prompted 136 to choose between returning to the transaction menu 108 or ending the transaction.

If any method of additional payment is not validated, either currency or card, the try again menu 142 comes up, offering the user the chance to try again, using either the same or a different method of additional payment, or the user may choose to return to the transaction menu 108.

Figure 8:
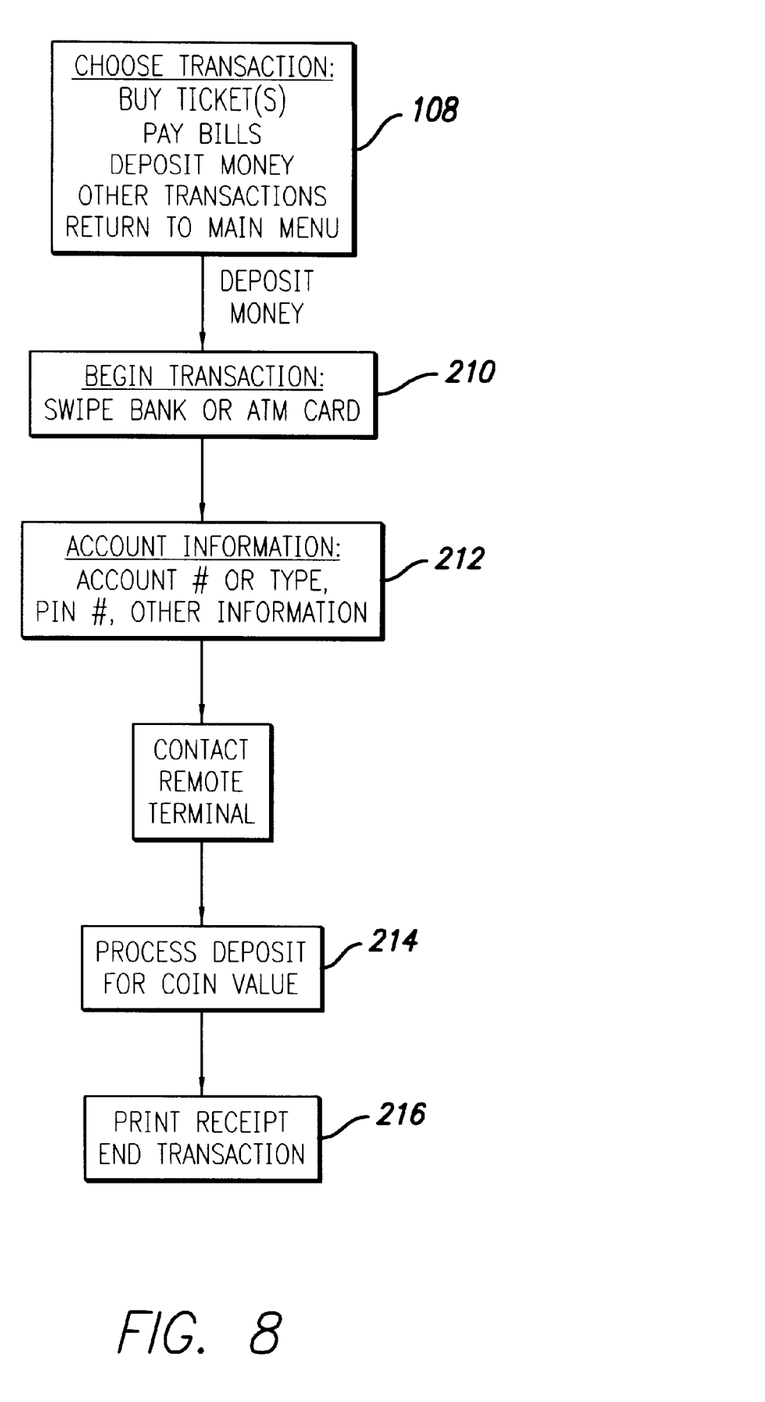
FIG. 8 is a flow chart illustrating an exemplary deposit transaction performed by a kiosk.

FIG. 8 provides a detailed diagram of a deposit transaction. From the transaction menu 108, the user chooses deposit money, bringing up a prompt 210 to the user to swipe a bank or ATM card. After swiping the bank or ATM card, the account information screen 212 prompts for the information necessary to access the account. The remote terminal is accessed, and a deposit in the amount of the coin value is made 214. A receipt for the deposit is printed 216 and the transaction is ended.

Figure 9:
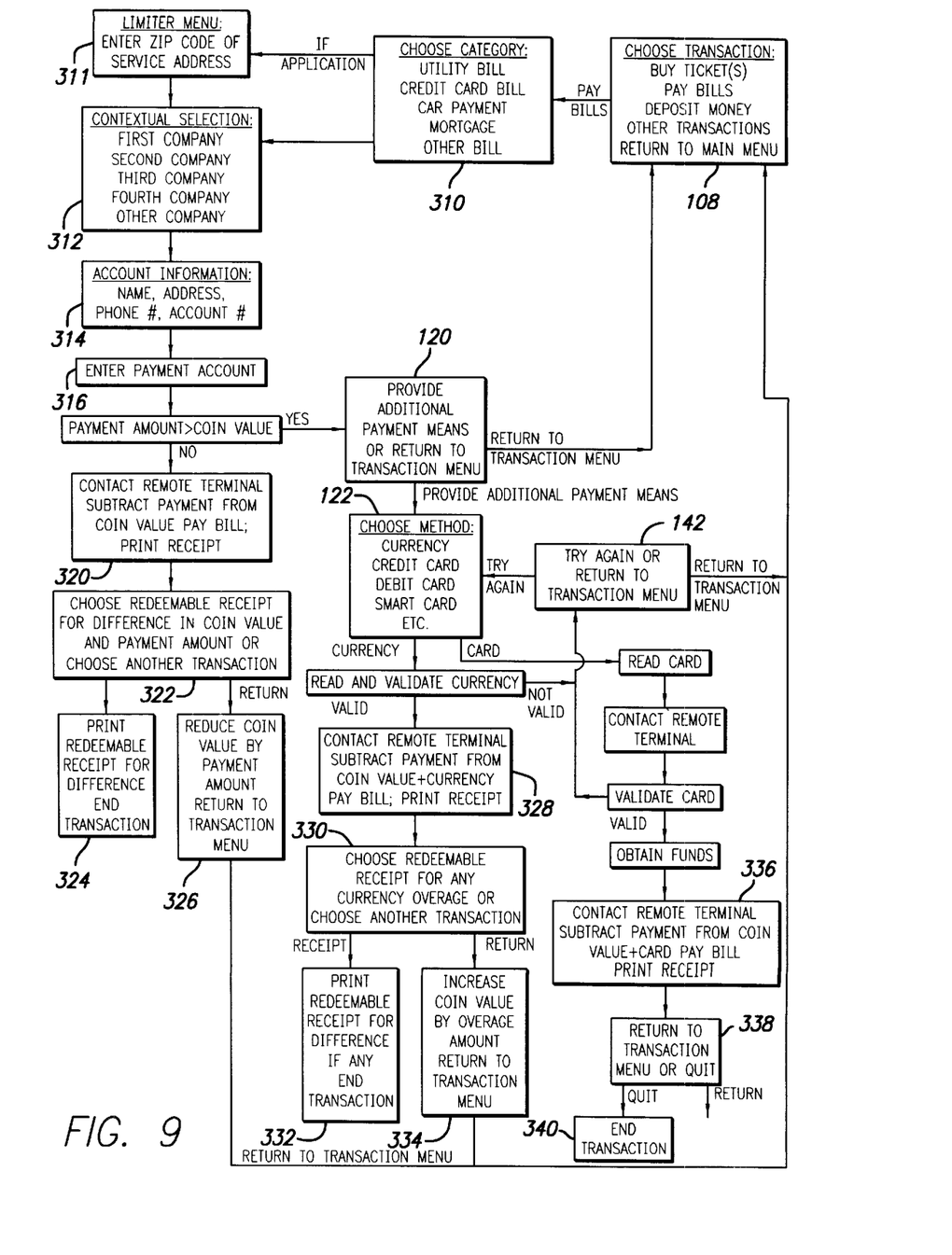
FIG. 9 is a flow chart illustrating an exemplary bill paying transaction performed by a kiosk.

FIG. 9 details a typical bill paying transaction. From the transaction menu 108 the user chooses to pay a bill, bringing up the bill category menu 310. After selecting the type of bill to be paid, one or more limiting menus 311 may come up, depending on the bill category. For example, if the user selects utility bill from menu 310, menu 311 would come up prompting the user to enter the zip code of the service address, in order to limit the possible utility companies based on which companies provide services in the given geographic area. A second limiting menu would prompt the user to choose the type of utility, such as phone electric gas or water. For example, if the user selected phone bill, company menu 312 would then come up, offering choices of possible phone companies to pay, such as GTE, AT&T, Pacific Bell, Sprint or MCI. Based on that response, the account information screen 314 would prompt the user for the information necessary to access the account and pay the bill. The payment amount screen 314 then prompts the user to enter the desired amount to be paid.

If the amount to be paid is less than the coin value, the remote terminal is contacted, the amount is paid, a receipt is printed and the transaction ends 320. The user is then prompted 322 to choose either a redeemable receipt for any difference between the coin value and the amount of the payment, or to return to the transaction menu 108 for additional transactions. If the user chooses a redeemable receipt 324, a receipt is printed and the transaction ends. If the user chooses to return to the transaction menu 108, the coin value is decreased by the amount of the payment and the transaction menu is displayed 326.

If the amount to be paid is greater than the coin value, the additional payment menu 120 is displayed. The user may choose to return to the transaction menu 108, or provide additional payments means. If the additional payment means is selected, a method of additional payment menu 122 is displayed.

The user may provide currency, which is read and validated 124. If valid, the remote terminal is contacted, the payment is made, the payment is subtracted from the combined value of the coins and the currency and a receipt issued 328. The user is then prompted 330 to choose either a redeemable receipt for any overage, or to return to the transaction menu for additional transactions. An overage occurs when the value of the coins plus the valid currency provided exceeds the amount of payment. If the user chooses a redeemable receipt 332, a receipt is printed and the transaction ends. If the user chooses to return to the transaction menu 108, the coin value is increased by the amount of the overage and the transaction menu is displayed 334.

The method of additional payment menu 122 also offers the use of credit card, debit card, or smart card. The user reads the card in the reader provided, and a remote terminal is contacted to verify the card. If verified, the funds are obtained. The remote terminal is contacted, the ticket is purchased, payment is subtracted from the combined value of the coins and the card, and a receipt issued 336. The user is then prompted 338 to choose between returning to the transaction menu 108 or ending the transaction.

If any method of additional payment is not validated, either currency or card, the try again menu 142 comes up, offering the user the chance to try again, using either the same or a different method of additional payment, or the user may choose to return to the transaction menu 108.

It is apparent from the foregoing that embodiments of the present invention satisfies an immediate need for a multi-transactional coin machine. This coin machine may be embodied in other specific forms and can be used with a variety of remote terminals without departing from the spirit or essential attributes of the present invention. It is therefore desired that the described embodiments be considered in all respects as illustrative and not restrictive, reference being made to the appended claims rather than the foregoing description to indicate the scope of the invention.

What is claimed is:

1. A coin counting machine, comprising:
    a coin discriminator sensor;
    a coin hopper having a container for receiving a plurality of coins, and a feed for feeding the coins in the container to the coin discriminator sensor;
    a controller for calculating a monetary value of said coins responsive to said coin discriminator sensor;
    a transport device for transporting the coins from a user to the container at a controlled flow rate, said flow rate being a function of a quantity of coins in the container;
    wherein the controller causes the container to dispense debris therefrom after all the coins have been extracted from the container by the feed; and
    wherein said feed comprises a moveable backplate biased toward the container and a circular disc rotatably mounted to the moveable backplate, and said controller causes the container to dispense the debris by moving the moveable backplate away from the container.

2. A coin counting machine, comprising:
    a coin discriminator sensor;
    a coin hopper having a container for receiving a plurality of coins, and a feed for feeding the coins in the container to the coin discriminator sensor;
    a controller for calculating a monetary value of said coins responsive to said coin discriminator sensor;
    a transport device for transporting the coins from a user to the container at a controlled flow rate, said flow rate being a function of a quantity of coins in the container;
    a coin input tray for receiving said coins from the user and coupling said received coins to the transport device, wherein said coin input tray is adapted to couple coins to the transport device by lifting one end of the input tray, and further comprising a lock down mechanism to selectively prohibit the lifting of said one end of the input tray.

3. A coin counting machine, comprising:
    a coin discriminator sensor;
    a coin hopper having a container for receiving a plurality of coins, and a feed for feeding the coins in the container to the coin discriminator sensor;
    a controller for calculating a monetary value of said coins responsive to said coin discriminator sensor, said controller causing the container to dispense debris therefrom after all the coins have been extracted from the container by the feed;
    wherein said feed comprises a moveable backplate biased toward the container and a circular disc rotatably mounted to said moveable backplate, and said controller causes the container to dispense the debris by moving the moveable backplate away from the container.

4. A remote transaction machine for applying a monetary value of coins deposited by a user to a remote transaction, comprising:
    a coin counting module operable to count coins deposited therein by a user, and to calculate a monetary value therefor;
    a computer connected to said coin counting module, said computer comprising a processor, a memory, a user interface, and a connection for communicating transaction information over a communication link connected thereto, wherein said processor is adapted to execute program instructions stored in said memory, said program instructions comprising:
        generating a transaction request according to an option selected by the user from a menu of transaction options provided on said user interface;
        sending the transaction request to a remote recipient via a communication link connected to said connection;
        receiving a response back from the remote recipient via the communication link;
        providing the response received from the remote recipient to the user using said user interface; and
        confirming a transaction between the user and the remote recipient, wherein the transaction includes a payment by the user to the remote recipient,
    wherein said coin counting module retains at least a portion of the coins deposited by the user having a monetary value equal to at least a portion of the payment by the user to the remote recipient, and wherein said coin counting module further comprises a coin discriminator sensor and a container for receiving the coins deposited by a user, and wherein said coin counting module further comprises a movable backplate biased toward said container for dispensing debris from said container.

5. A remote transaction machine for applying a monetary value of coins deposited by a user to a remote transaction, comprising:

a coin counting module operable to count coins deposited therein by a user, and to calculate a monetary value therefor;

a computer connected to said coin counting module, said computer comprising a processor, a memory, a user interface, and a connection for communicating transaction information over a communication link connected thereto, wherein said processor is adapted to execute program instructions stored in said memory, said program instructions comprising:

generating a transaction request according to an option selected by the user from a menu of transaction options provided on said user interface;

sending the transaction request to a remote recipient via a communication link connected to said connection;

receiving a response back from the remote recipient via the communication link;

providing the response received from the remote recipient to the user using said user interface; and confirming a transaction between the user and the remote recipient, wherein the transaction includes a payment by the user to the remote recipient wherein, said coin counting module retains at least a portion of the coins deposited by the user having a monetary value equal to at least a portion of the payment by the user to the remote recipient, and wherein said coin counting module further comprises a coin discriminator sensor and a container for receiving the coins deposited by a user, said coin counting module further comprising a coin rail, a feed for extracting coins from said container onto said rail, and a solenoid positioned to expel non-authentic coins from said rail, and wherein said coin counting module further comprises at least one air hose positioned to direct compressed air onto said coin rail.

* * * * *